June 14, 1927.
C. F. SCHNEIDER
FISHING APPARATUS
Filed Nov. 26, 1926
1,632,566
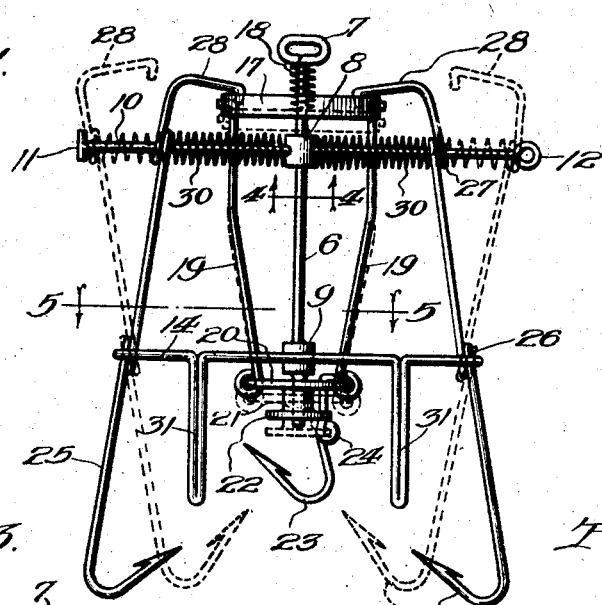
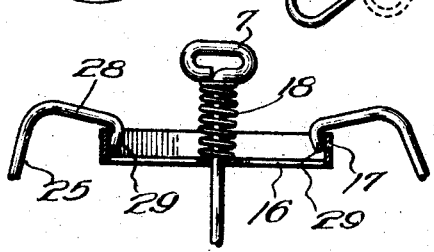
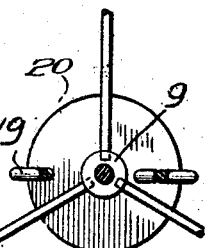
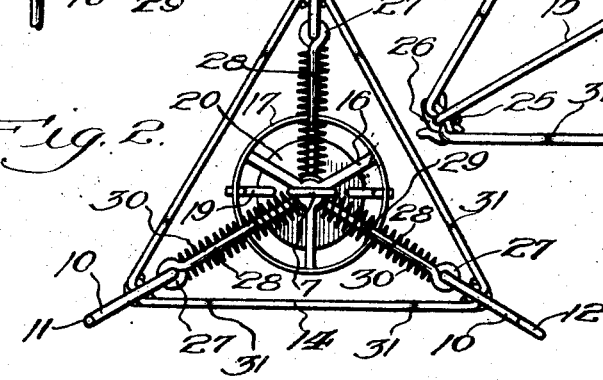
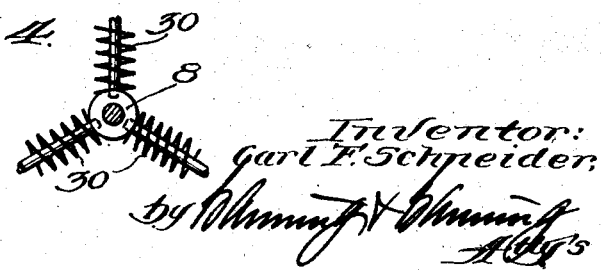
Inventor:
Carl F. Schneider Patented June 14, 1927.

1,632,566

UNITED STATES PATENT OFFICE.

CARL F. SCHNEIDER, OF CHICAGO, ILLINOIS.

FISHING APPARATUS.

Application filed November 26, 1926. Serial No. 150,992.

This invention relates to an apparatus for catching fish, and combines with a bait hook other hooks which are movable to trap and hold the fish.

It is a primary object of this invention to produce an apparatus of this character which is simple in construction and operation; also to so relate the several parts of the apparatus that they will prove effective in bringing about the results desired. With these ends in view I have combined in the present construction numerous improvements which will be hereinafter set forth in detail.

A suggestive embodiment of this invention is set forth in the manner following—

Figure 1 is a side elevation of the apparatus in its entirety;

Fig. 2 is a plan view thereof;

Fig. 3 is an enlarged detail in elevation of the parts at the upper end of the apparatus.

Fig. 4 is a detail in section taken on line 4—4 of Fig. 1; and

Fig. 5 is a fragmentary detail in section taken on line 5—5 of Fig. 1.

The apparatus of this invention comprises a central stem 6 which is vertically disposed and provided at its upper end with a head in the form of a hook or eye 7 to which a line may conveniently be attached. Spaced from its upper end is a head 8 fixed on the stem, also a similar head 9 is affixed thereto in slightly spaced relation from its lower end. To the head 8 are connected certain radiating wires 10 here shown as three in number, and each formed at its outer extremity with a head 11 one of which, designated as 12, may take the form of an eye. The line, instead of attaching to the eye 7, may optionally be connected to the eye 12 in case it is desired to suspend the apparatus from a point at the side thereof. I provide also a wire frame 14 here shown as formed with three sides to correspond in number with the wires 10, this frame being in the form of a triangle with wires 15 connecting the corners thereof with the lower head 9.

Mounted on the stem 6 above the upper head 8 is a slidable spider 16 supporting an upturned circular flange 17. A light compression spring 18 is interposed between the eye 7 and the spider so as to cause the latter to normally rest upon the head 8 therebelow. Depending from the spider and connected thereto are a pair of links 19 the lower ends of which have connection with a flange 20 forming part of a collar 21 which is slidably mounted on the lower end of the stem 6 below the head 9 thereof. By reason of the link connections 19 the collar 21 and spider 16 constitute a unit which is movable relative to the stem 6 and parts associated therewith. The collar 21 is provided with a second flange 22 at its lower end in spaced relation to its upper flange 20. In this lower flange is a hole through which is extended the shank of a bait hook 23 provided by preference with a kink or coil 24 which abuts the lower face of the flange 22. The shank of this hook extends on through a hole in the upper collar flange 20, and is clinched thereupon so as to obtain a fixed mounting upon the collar 21.

Cooperating with the bait hook are other trap hooks 25, preferably three in number so as to correspond with the wires 10. The shank of each trap hook is coiled around to form a loop 26 which encircles the frame 14 preferably at one corner thereof. A second loop 27 in each trap hook is also provided for encircling one of the wires 10. By forming the trap hooks in this manner I provide a pivotal mounting for each upon the frame 14, such that the several hooks may swing to inner or outer positions, with the wires 10 guiding their movements, all as indicated by the full and dotted lines in Fig. 1. The upper extremity of each trap hook is inwardly bent as at 28 to overlie the marginal wall 17 of the spider 16, the extremity of each hook being further bent downwardly in the form of a catch 29 to engage with the inner face of the spider wall. A coiled compression spring 30 is mounted upon each of the wires 10 between the common head 8 and the trap hooks so as to exert an outward pressure upon the loops 27 thereof. When in normal position, these loops rest against the wire heads 11 and 12.

It may be desirable to provide guards depending from the frame 14 between the several trap hooks. A simple means for this purpose is shown in Fig. 1 wherein the wire constituting this frame is downwardly bent as at 31 and then returned again to form a slight barrier. The bait which is suspended from the hook 23 is, therefore, made accessible only from the lower end of the fishing apparatus.

In the use of this device the upper ends of the trap hooks are swung inwardly and the spider 16 is then drawn up against the tension of the spring 18. The frictional engagement of the hook catches 29 with the spider wall 17 will suffice to maintain the spider unit in elevated position with the trap hooks occupying positions as indicated by the full lines in Fig. 1. If a fish tugs at bait which is carried on the hook 23, the slight pull resulting therefrom will have the effect of displacing the spider 16 from its upper position, this movement being aided by pressure from the spring 18. The moment that the wall 17 clears the upper ends of the catches 29, the lower ends of the trap hooks will spring inwardly to hold the fish which is responsible for this movement of the parts.

The entire structure has been designed with a view to simplicity in manufacture, assembly and use. It presents no complication and will be found durable and satisfactory over a prolonged period of service.

I claim:

1. In combination with a stem to which is connected fast a pivotal support and guiding means, trap hooks mounted to swing upon the pivotal support and receive guidance from said means and arranged to approach each other at their acting ends, a bait hook carried slidably on the stem and having an associated wall, there being a catch on each trap hook adapted to engage releasably with the wall to retain said hooks in one position, spring means tending to swing the trap hooks from the wall to a second position, and other tension means exerting a force on the wall auxiliary to the pull of a fish on the bait hook whereby to release the several trap hooks, substantially as described.

2. In a fishing apparatus, the combination with a slidable bait hook of pivotally mounted trap hooks adapted to advance their acting ends toward a common center, means remote from the pivotal mounting of the trap hooks for guiding the swinging movements of the latter, and a catch connection between each trap hook and a part associated with the bait hook whereby sliding movement of the latter will release the former for swinging movement, substantially as described.

3. In a fishing apparatus, the combination of a central bait hook having a slidable mounting of a plurality of pivotally mounted trap hooks grouped about the bait hook and adapted to swing their acting ends toward the latter, spring means urging the trap hooks to so swing, other spring means of lesser tension urging the bait hook to slide in one direction, and means fast with the bait hook forming a catch connection with the trap hooks maintained by friction and releasable when a force auxiliary to the last mentioned spring means is applied to the fish hook, substantially as described.

4. In a fishing apparatus, the combination of a frame with depending guards, a stem to which the frame is fixedly connected, trap hooks having a pivotal connection intermediate their ends with the frame between the guards thereof, a bait hook slidably mounted on the stem, a common catch connection with the several trap hooks, and means connecting the bait hook with said catch connection adapted to release the trap hooks when the bait hook is moved upon the stem, substantially as described.

5. In a fishing apparatus, the combination of a stem having radiating guides and other radiating supports to which is connected a frame, a bait hook movably carried by the stem, trap hooks pivotally mounted on the frame and slidably connected with the guides, a compression spring associated with each guide and exerting a pressure on one trap hook, and a catch connection between the several trap hooks and the bait hook and adapted to release the former in response to movement of the latter, substantially as described.

CARL F. SCHNEIDER.